US012663342B2

(12) United States Patent
Deng et al.

(10) Patent No.: US 12,663,342 B2
(45) Date of Patent: Jun. 23, 2026

(54) VIBRATION TEST BENCH FOR PERMANENT MAGLEV TRAIN

(71) Applicants: JIANGXI UNIVERSITY OF SCIENCE AND TECHNOLOGY, Ganzhou (CN); Guorui Scientific Innovation Rare Earth Functional Materials (Gan zhou) Co., Ltd., Ganzhou City (TW)

(72) Inventors: Yongfang Deng, Ganzhou (CN); Kun Cao, Ganzhou (CN); Jincheng Zeng, Ganzhou (CN)

(73) Assignees: JIANGXI UNIVERSITY OF SCIENCE AND TECHNOLOGY, Ganzhou (CN); GUORUI SCIENTIFIC INNOVATION RARE EARTH FUNCTIONAL MATERIALS (GANZHOU) CO., LTD., Ganzhou City (CN)

( * ) Notice: Subject to any disclaimer, the term of this patent is extended or adjusted under 35 U.S.C. 154(b) by 160 days.

(21) Appl. No.: 18/521,047

(22) Filed: Nov. 28, 2023

(65) Prior Publication Data

US 2024/0175785 A1　May 30, 2024

(30) Foreign Application Priority Data

Nov. 28, 2022　(CN) ......................... 202211499029.X

(51) Int. Cl.
*G01M 17/10* (2006.01)
*B61B 13/08* (2006.01)

(52) U.S. Cl.
CPC ............. *G01M 17/10* (2013.01); *B61B 13/08* (2013.01)

(58) Field of Classification Search
CPC ........ G01M 17/08; G01M 17/10; B61B 13/08
See application file for complete search history.

(56) References Cited

U.S. PATENT DOCUMENTS 11,366,038 B1 * 6/2022 Deng ....................... G01H 1/12

FOREIGN PATENT DOCUMENTS

| CN | 111076884 A | * | 4/2020 | ............ G01M 17/08 |
| CN | 210437020 U | | 5/2020 | |

(Continued)

OTHER PUBLICATIONS

Li Hong, et al., The Design of the Maglev Train Model and the Related Load Measuring Device, LI Hong etc. and machine translation thereof, 1994-2024, China Academic Journal Electronic Publishing House.

*Primary Examiner* — Paul M. West
(74) *Attorney, Agent, or Firm* — WPAT, PC

(57) ABSTRACT

The present application provides a vibration test bench for a permanent maglev train, which comprises: a base, a vertical excitation system, a permanent magnet track simulation system, a gantry-type supporting frame, a suspension platform, a lateral excitation system and a longitudinal excitation system. In the present application, the positional relationship among the levitation frame of the permanent maglev train, the suspension platform and the permanent magnet track simulation system is adjusted by means of the vertical excitation system, the lateral excitation system and the vertical excitation system respectively, the permanent maglev train is maintained in the levitated state by means of the permanent magnet track simulation system, and a variety of the working conditions, such as unsmooth passing on the track, etc., are simulated by means of the vertical excitation system and the lateral excitation system respectively. The vibration test bench for a permanent maglev train in the present disclosure can be used to test the dynamic perfor- (Continued)

mance of a permanent maglev train in a freely levitated state, and further can test the dynamic performance of train-track coupling, and has a wide application range.

8 Claims, 2 Drawing Sheets

(56)                 References Cited

FOREIGN PATENT DOCUMENTS

| | | | | |
|---|---|---|---|---|
| CN | 211014610 U | | 7/2020 | |
| CN | 111845828 A | | 10/2020 | |
| CN | 112098116 A | | 12/2020 | |
| CN | 112798210 A | | 5/2021 | |
| CN | 113085565 A | | 7/2021 | |
| CN | 214702674 U | * | 11/2021 | |
| CN | 114252280 A | * | 3/2022 | ............ G01M 17/08 |
| KR | 100786601 B1 | | 12/2007 | |

* cited by examiner

VIBRATION TEST BENCH FOR PERMANENT MAGLEV TRAIN

CROSS REFERENCE TO RELATED APPLICATIONS

This application claims priority to Chinese Application No. 202211499029.X, filed on Nov. 28, 2022, entitled "Vibration Test Bench for Permanent Maglev Train", which is specifically and entirely incorporated by reference.

FIELD

The present application relates to the field of maglev trains, in particular to a vibration test bench for a permanent maglev train.

BACKGROUND

A maglev train utilizes the levitation force generated between permanent magnets or between a permanent magnet and an induced magnetic field to run without contact with the track; thus, the problems of conventional trains, including the friction between the wheels and the track and resultant wear and mechanical noise, are solved. Permanent maglev trains are one of the typical and representative applications of the maglev train technology. A permanent maglev train realizes train levitation by means of the repulsion between a permanent maglev module mounted on the levitation frame and a permanent magnetic track mounted in the track beam, and doesn't require electric power supply during the levitation. Compared with other maglev trains, permanent maglev trains have the advantages of strong levitation force, satisfactory economic and safety performance, environmental protection, and lower energy consumption and simpler structure.

During the operation of an existing permanent maglev train, the levitation module inevitably introduces problems such as lateral deviation and unsmooth coupling between the permanent magnet track and the inner wall of the track beam, which will affect the dynamic performance of the permanent maglev system.

The existing vibration test benches for maglev trains are mainly designed for normal-temperature conductive maglev trains and high-temperature superconductive maglev trains, and can't systematically perform simulation tests for the train-track coupling of permanent maglev trains. In order to study the dynamic performance of permanent maglev rail transit efficiently and accurately, it is necessary to develop an experimental apparatus that can simulate the operation of permanent maglev trains and test their dynamic performance.

SUMMARY

To overcome the shortcomings in the prior art, the present application provides a vibration test bench for a permanent maglev train, which utilizes hydraulic vibrators to simulate a variety of working conditions of a permanent maglev train such as unsmooth passing on the track, and can support simulation tests of track-train coupling of a permanent maglev train. The present application employs the following technical scheme:

Firstly, in order to attain the above object, a vibration test bench for a permanent maglev train is proposed, comprising: a base; a vertical excitation system arranged on the base for outputting vertical excitation; a permanent magnet track simulation system, the bottom of which is connected to the vertical excitation system and receives the vertical excitation outputted from the vertical excitation system to move up and down; a gantry-type support frame spanning the permanent magnet track simulation system and having a cross beam fixed above the permanent magnet track simulation system; a suspension platform fixedly connected to the cross beam of the gantry-type supporting frame and arranged between the cross beam and the permanent magnet track simulation system for accommodating a levitation frame of the permanent maglev train to run therein in a levitated state; a lateral excitation system for outputting lateral excitation; and a longitudinal excitation system arranged at the top of the suspension platform and provided with pull rods connecting the suspension platform and the levitation frame of the permanent maglev train for restraining the degree of freedom of the longitudinal displacement of the levitation frame of the permanent maglev train.

Optionally, in the vibration test bench for a permanent maglev train as described above, the vertical excitation system comprises: a vertical hydraulic vibrator, the bottom of which is fixedly connected to the base; and a permanent magnet track rotating and supporting platform, which is arranged above the base and fixedly connected to the top of the vertical hydraulic vibrator, and is driven by the vertical hydraulic vibrator to move up and down with respect to the base.

Optionally, in the vibration test bench for a permanent maglev train as described above, the permanent magnet track simulation system comprises: rolling bearings fixedly mounted above the permanent magnet track rotating and supporting platform; a fixed rotating shaft mounted in the rolling bearings and arranged between the cross beam of the gantry-type supporting frame and the permanent magnet track rotating and supporting platform in parallel; a permanent magnet track rotating disc, which is rotatably mounted on the fixed rotating shaft and arranged between the permanent magnet track rotating and supporting platform and the suspension platform; a permanent magnet track rotating motor, which is a transmission connection to the fixed rotating shaft and drives the permanent magnet track rotating disc to rotate; a permanent magnet track, which is laid on the periphery of the permanent magnet track rotating disc and arranged below the levitation frame of the permanent maglev train in the suspension platform, and synchronously rotates along with the rotation of the permanent magnet track rotating disc; wherein the levitation frame of the permanent maglev train is levitated above the permanent magnet track and maintained in the suspension platform.

Optionally, in the vibration test bench for a permanent maglev train as described above, the lateral excitation system comprises: a lateral hydraulic vibrator, which is hinged between the base and the permanent magnet track rotating and supporting platform and configured to drive the permanent magnet track rotating and supporting platform to drive the permanent magnet track rotating disc and the permanent magnet track to output lateral vibration force and displacement with respect to the levitation frame of the permanent magnet train.

Optionally, in the vibration test bench for a permanent maglev train as described above, the bottom of the suspension platform is provided with an opening in which several rollers are arranged; the rollers are parallel to the cross beam and are arranged on two sides in the opening of the suspension platform, and the rollers on the two sides are arranged opposite to each other and respectively fixed on two sides of the levitation frame of the permanent maglev train for restraining the lateral displacement of the levitation frame of the permanent magnet train.

Optionally, in the vibration test bench for a permanent maglev train as described above, the lateral excitation system further comprises: a lateral hydraulic vibrator for guide module, which is fixedly arranged on an inner side wall of the suspension platform and connected with the rollers for outputting lateral excitation to drive the rollers and adjusting the lateral spacing between the rollers and the levitation frame of the permanent maglev train.

Optionally, in the vibration test bench for a permanent maglev train as described above, the top of the suspension platform is further provided with a roller rotating motor, which is in a transmission connection with an upper roller shaft and a lower roller shaft arranged inside the suspension platform, wherein the upper roller shaft is in a transmission connection with ones of the rollers mounted on the upper part of the inner side wall of the suspension platform, the lower roller shaft is in a transmission connection with other ones of the rollers mounted on the lower part of the inner side wall of the suspension platform, the upper roller shaft and the lower roller shaft are in a transmission connection via a coupling, and the roller rotating motor drives the rollers on the inner side wall of the suspension platform to rotate correspondingly via the upper roller shaft and the lower roller shaft.

Optionally, in the vibration test bench for a permanent maglev train as described above, the longitudinal excitation system comprises: a longitudinal restraining platform for levitation, which is fixedly arranged at the inner side of the suspension platform and located at the top of the levitation frame of the permanent maglev train, wherein the pull rods are respectively arranged at the front and rear ends of the longitudinal restraining platform for levitation and hinged to the front and rear ends of the levitation frame of the permanent maglev train.

Optionally, in the vibration test bench for a permanent maglev train as described above, the vertical hydraulic vibrator, the lateral hydraulic vibrator, the lateral hydraulic vibrator for guide module, the roller rotating motor and the permanent magnet track rotating motor are respectively connected to a computer to adjust the driving output in response to the control instructions of the computer.

Optionally, in the vibration test bench for a permanent maglev train as described above, the suspension platform is further provided with a force sensor and a vibration sensor, which are respectively connected to the computer to collect the operation data of the levitation frame of the maglev train.

Beneficial Effects

The vibration test bench for a permanent maglev train provided in the present application comprises: a base, a vertical excitation system, a permanent magnet track simulation system, a gantry-type supporting frame, a suspension platform, a lateral excitation system and a longitudinal excitation system. In the present application, the positional relationship among the levitation frame of the permanent maglev train, the suspension platform and the permanent magnet track simulation system is adjusted by means of the vertical excitation system, the lateral excitation system and the vertical excitation system respectively, the permanent maglev train is maintained in the levitated state by means of the permanent magnet track simulation system, and a variety of the working conditions, such as unsmooth passing on the track, etc., are simulated by means of the vertical excitation system and the lateral excitation system respectively. The vibration test bench for a permanent maglev train in the present disclosure can be used to test the dynamic performance of a permanent maglev train in a freely levitated state, and further can test the dynamic performance of train-track coupling, and has a wide application range.

Other features and advantages of the present application will be detailed in the following description, and will become obvious partially from the description or be understood through implementation of the present application.

BRIEF DESCRIPTION OF THE DRAWINGS

The accompanying drawings are provided for further understanding of the present application, and constitute a part of the specification. These drawings are used in conjunction with the embodiments of the present application to interpret the present application, but don't constitute any limitation to the present application. In the figures.

In the Figures: 1—base; 2—vertical hydraulic vibrator; 3—permanent magnet track rotating and supporting platform; 4—permanent magnet track; 5—gantry-type supporting frame; 6—levitation frame of the permanent maglev train; 7—suspension platform; 8—roller rotating motor; 9—permanent magnet track rotating motor; 10—permanent magnet track rotating disc; 11—lateral hydraulic vibrator; 12—lateral hydraulic vibrator for guide module; 13—coupling; 14—roller; 15—longitudinal restraining platform for levitation; 16—permanent maglev module; 17—guide module.

DETAILED DESCRIPTION

To make the object and technical scheme of the embodiments of the present application understood more clearly, the technical scheme in the embodiments of the present application will be detailed below clearly and completely, with reference to the accompanying drawings in the embodiments of the present application. Apparently, the embodiments described herein are only some possible embodiments of the present application rather than all embodiments of the present application. Those skilled in the art can obtain other embodiments based on the embodiments provided herein without expending any creative labor; however, all those embodiments shall be deemed as falling in the scope of protection of the present application.

Those skilled in the art can easily understand that all terms used herein (including technical terms and scientific terms) are intended to have the common meanings that are comprehended by those having ordinary skills in the art to which the present application belongs, unless otherwise defined. It should also be understood that those terms defined in general dictionaries should be understood as having meanings in line with their meanings in the context of the prior art, and should not be comprehended as having meanings that are too ideally or formally, unless otherwise defined herein.

The terms "inside" and "outside" mentioned herein refers to that the direction from the gantry-type support frame to the rollers inside the suspension platform is toward inside, while the opposite direction is toward outside; they are not intended to impose any specific limitation on the mechanism of the device in the present application.

The term "connection" mentioned herein may be a direct connection between components or an indirect connection between components via other components.

The terms "top" and "bottom" mentioned herein means that the direction from the bottom plate to the top end of the gantry-type support frame is toward top while the opposite direction is toward the bottom when the user is facing the vibration test bench for a permanent maglev train; they are not intended to impose any specific limitation on the mechanism of the device in the present application.

Figure 1:
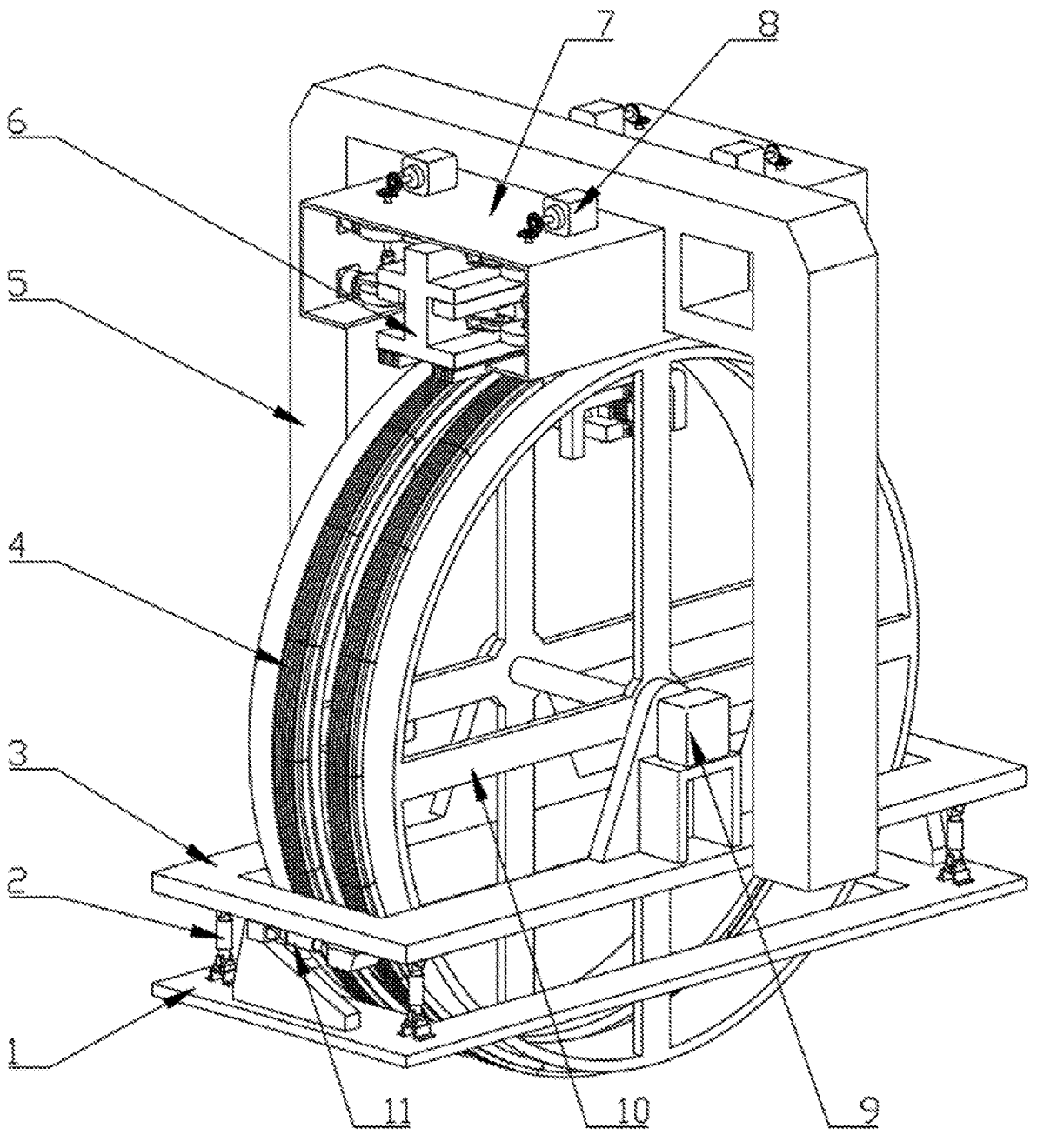
FIG. 1 is a schematic diagram of the overall structure of the vibration test bench for a permanent maglev train provided by the present application.

FIG. 1 shows the vibration test bench for a permanent maglev train provided by the present application, which comprises:

a base 1;

a vertical excitation system arranged on the base 1 for outputting vertical excitation; the vertical excitation system may generally be arranged to comprise: a vertical hydraulic vibrator 2 for permanent magnet track, the bottom of which is fixedly connected to the base 1; and a permanent magnet track rotating and supporting platform 3, which is arranged above the base 1 and fixedly connected to the top of the vertical hydraulic vibrator 2, and is driven by the vertical hydraulic vibrator 2 to move up and down with respect to the base 1;

a permanent magnet track simulation system, the bottom of which is connected to the vertical excitation system and receives the vertical excitation outputted from the vertical excitation system to move up and down; generally, in order to simulate the operation state of the maglev system, the permanent magnet track simulation system may be configured to comprise: rolling bearings fixedly mounted above the permanent magnet track rotating and supporting platform 3; a fixed rotating shaft mounted in the rolling bearings and arranged between the cross beam of the gantry-type supporting frame 5 and the permanent magnet track rotating and supporting platform 3 in parallel; a permanent magnet track rotating disc 10, which is rotatably mounted on the fixed rotating shaft and arranged between the permanent magnet track rotating and supporting platform 3 and the suspension platform 7; a permanent magnet track rotating motor 9, which is a transmission connection to the fixed rotating shaft and drives the permanent magnet track rotating disc 10 to rotate; a permanent magnet track 4, which is laid on the periphery of the permanent magnet track rotating disc 10 and arranged below the levitation frame 6 of the permanent maglev train in the suspension platform 7, and synchronously rotates along with the rotation of the permanent magnet track rotating disc 10;

a gantry-type supporting frame 5 spanning the permanent magnet track simulation system and having a cross beam fixed above the permanent magnet track simulation system;

a suspension platform 7 fixedly connected to the cross beam of the gantry-type supporting frame 5 and arranged between the cross beam and the permanent magnet track simulation system for accommodating a levitation frame 6 of the permanent maglev train to run therein in a levitated state;

a lateral excitation system for outputting lateral excitation; generally, the lateral excitation system may be configured to comprise: a lateral hydraulic vibrator 11 for permanent magnet track, which is hinged between the base 1 and the permanent magnet track rotating and supporting platform 3 and configured to drive the permanent magnet track rotating and supporting platform 3 to drive the permanent magnet track rotating disc 10 and the permanent magnet track 4 to output lateral vibration force and displacement with respect to the levitation frame 6 of the permanent magnet train;

a longitudinal excitation system arranged at the top of the suspension platform 7 and provided with pull rods connecting the suspension platform 7 and the levitation frame 6 of the permanent maglev train for restraining the degree of freedom of the longitudinal displacement of the levitation frame 6 of the permanent maglev train.

In the present application, the levitation frame 6 of the permanent maglev train mounted in the suspension platform 7 usually may be maintained in a levitated state above the permanent magnet track 4 by the repulsion of the permanent maglev module 16 at the bottom, and may be maintained inside the suspension platform 7 by the guiding action of the guide modules at the two ends. Thus, the driving outputs of the vertical hydraulic vibrator 2, the lateral hydraulic vibrator 11 for permanent magnetic track, the lateral hydraulic vibrator 12 for guide module, the roller rotating motor 8 and the permanent magnetic track rotating motor 9 are adjusted by means of computer control instructions, so as to simulate a variety of operating conditions respectively, such as unsmooth passing on the track and lateral deviation of the levitation module, etc., and test the dynamic performance of the permanent maglev train in a free levitation state and the dynamic performance of train-track coupling.

In a more specific implementation, the vibration test bench in the present application may be further configured to comprise the base 1 shown in FIG. 1, the vertical hydraulic vibrator 2, the permanent magnet track rotating and supporting platform 3, the permanent magnet track rotating disc 10, the levitation frame 6 of the permanent maglev train, the longitudinal restraining platform 15 for levitation and the suspension platform 7; the vertical hydraulic vibrator 2 is fixedly arranged above the base 1 via a mounting seat; the permanent magnet rail rotating and supporting platform 3 is arranged above the vertical hydraulic vibrator 2, and the bottom of the permanent magnet rail rotating and supporting platform 3 is hinged to the vertical hydraulic vibrator; the permanent magnet track rotating disc 10 is arranged above the permanent magnet track rotating and supporting platform 3; the levitation frame 6 of the permanent maglev train is arranged above the permanent magnet track rotating disc 10; the longitudinal restraining platform 15 for levitation is above the levitation frame 6 of the permanent maglev train; the suspension platform 7 is arranged above the longitudinal restraining platform 15 for levitation.

The vertical hydraulic vibrator 2 can provide vertical excitation, which can be used by the vertical hydraulic vibrator 2 to simulate a variety of working conditions, such as unsmooth passing on the permanent magnet track; the permanent magnet track rotating and supporting platform 3 is flush with the ground, while the base 1 is located underground; thus, the height of the vibration test bench for a permanent maglev train above the ground can be reduced; through the rotation of the permanent magnet track rotating disk 10, the permanent magnet track on it can be driven to rotate, thereby the running speed of the permanent maglev train can be simulated.

The base 1 is further provided with a lateral hydraulic vibrator 11, the two ends of which are respectively hinged to the base 1 and the permanent magnet track rotating and supporting platform 3.

The lateral hydraulic vibrator 11 can provide lateral excitation, which can be used to simulate a variety of working conditions, such as lateral deviation of the levitation module.

A permanent magnet track rotating motor is further mounted above the permanent magnet track rotating and supporting platform 3. The permanent magnet track rotating motor 9 can provide power to the permanent magnet track rotating disc 10, so that the permanent magnet track 4 can be rotated. The permanent magnet track rotating disc 10 is mounted on the fixed rotating shaft, which is mounted on the permanent magnet track rotating and supporting platform 3 via rolling bearings, and one end of the shaft is connected to the permanent magnet track rotating motor 9. The permanent magnet track is mounted on the rotating disc.

Figure 2:
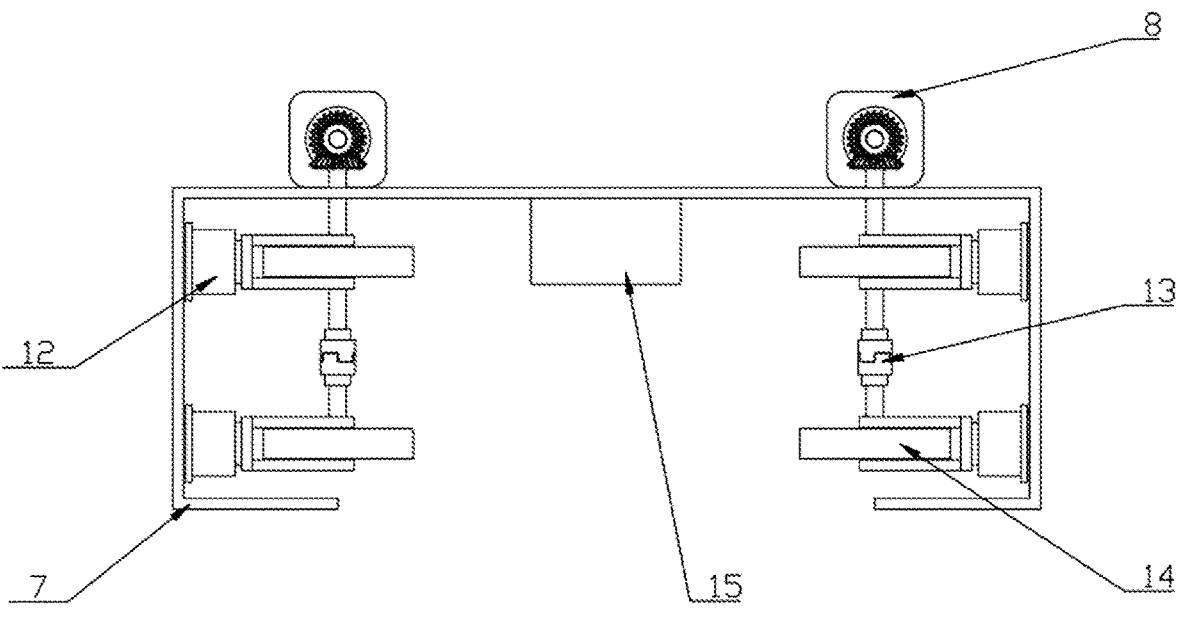
FIG. 2 is a schematic structural diagram of the suspension platform in the present application.
Figure 3:
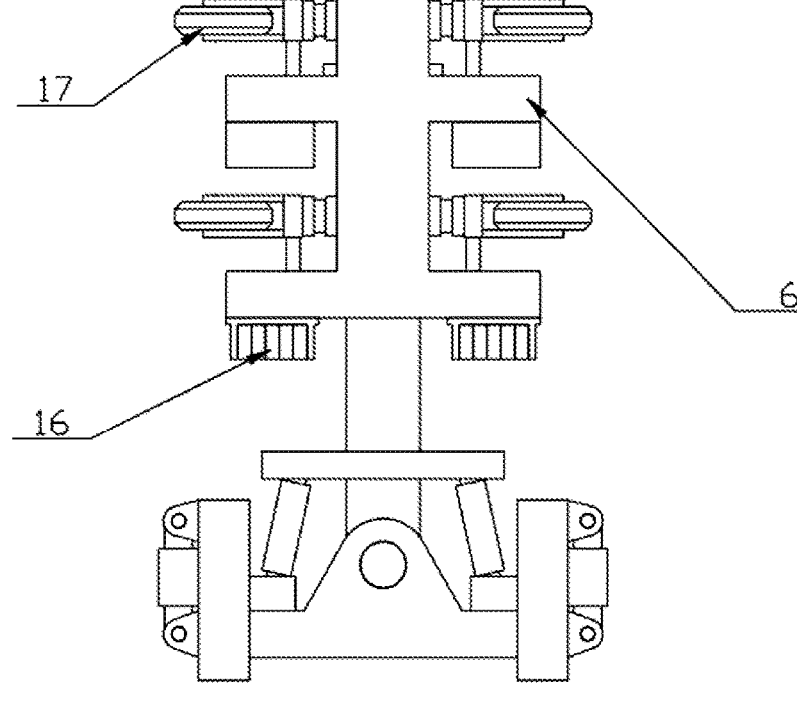
FIG. 3 is a schematic structural diagram of the levitation frame of the permanent maglev train in the present application.

As shown in FIG. 3, a permanent maglev module 16 is mounted at the bottom of the levitation frame 6 of the permanent maglev train, and a guide module 17 is mounted at the top of the levitation frame 6. The levitation frame 6 of the permanent maglev train can run in the suspension platform 7 shown in FIG. 2 under the constraining of the permanent maglev module 16 and the guide module 17. The bottom of the suspension platform 7 is provided with an opening in which several rollers 14 are arranged. The rollers 14 are parallel to the cross beam and arranged on the two sides of the opening at the bottom of the suspension platform 7. The rollers 14 on two sides are arranged opposite to each other and fixed on two sides of the levitation frame 6 of the permanent maglev train respectively for restraining the lateral displacement of the levitation frame 6 of the permanent maglev train.

A lateral excitation system may be mounted inside the suspension platform 7 to connect the rollers 14 through the lateral hydraulic vibrator 12 for guide module that is fixedly mounted on the inner side wall of the suspension platform 7, outputs lateral excitation to drive the rollers 14, and adjusts the lateral spacing between the rollers 14 and the levitation frame 6 of the permanent maglev train.

The rollers 14 may be driven by a roller rotating motor 8 arranged at the top of the suspension platform 7. The roller rotating motor 8 is in transmission connection with an upper roller shaft and a lower roller shaft arranged inside the suspension platform 7; the upper roller shaft is in transmission connection with the rollers 14 mounted at the upper part of the inner side wall of the suspension platform 7; the lower roller shaft is in transmission connection with the rollers 14 mounted at the lower part of the inner side wall of the suspension platform 7; the upper roller shaft and the lower roller shaft are in transmission connection via a coupling 13; and the roller rotating motor 8 drives the rollers 14 on the inner side wall of the suspension platform 7 to rotate correspondingly via the upper roller shaft and the lower roller shaft.

The top of the longitudinal restraining platform 15 for levitation may be arranged specifically to be connected to the suspension platform 7 to form a longitudinal excitation system. In the longitudinal excitation system, the longitudinal front and rear surfaces of the longitudinal restraining platform 15 for levitation are respectively provided with longitudinal pull rods hinged to the levitation frame 6 of the permanent maglev train, the pull rods extend forward and rearward from the longitudinal restraining platform 15 for levitation respectively, and the bottom ends of the front and rear pull rods are hinged to the front and rear ends of the levitation frame 6 of the permanent maglev train respectively.

The levitation frame of the maglev train can be restrained on the longitudinal restraining platform 15 for levitation during the vibration test. During the vibration test of the permanent maglev train, the longitudinal displacement of the levitation frame is restrained by the longitudinal pull rods of the levitation frame mounted on the longitudinal restraining platform 15 for levitation. An object has six degrees of freedom, namely, translation along three coordinate axes and rotation around the three coordinate axes; suppose the gravity direction is the vertical direction, the forward direction is the longitudinal direction, and the direction perpendicular to the forward direction in the horizontal plane is the lateral direction. Since the levitation force provided by the levitation module and the guiding force of the guide module 17 are in the vertical direction and the lateral direction and are deterministic respectively, the permanent maglev train can be restrained in the vertical direction and the horizontal direction; in view that there is restraining force on the permanent maglev train in the longitudinal direction, longitudinal pull rods are arranged to restrain the freedom of the longitudinal displacement of the levitation frame and limit the longitudinal displacement of the levitation frame.

Besides, the inner side of the suspension platform 7 is hinged to the lateral hydraulic vibrator 12 for guide module. The lateral hydraulic vibrator 12 for guide module is connected to the bottom of a U-shaped frame. The U-shaped frame supports the upper and lower roller shafts respectively via bearings. The upper roller shaft is connected with the lower roller shaft via a coupling 13, and the other end of the upper roller 14 is connected to the roller rotating motor 8 via a bevel gear. The upper and lower roller shafts are respectively provided with the rollers 14. The upper part of the suspension platform 7 is connected to the gantry-type supporting frame 5.

The force sensor and the vibration sensor arranged on the suspension platform 7 can collect the running state data of the train accordingly; the lateral hydraulic vibrator 12 for guide module can provide lateral excitation force, which can be used to simulate a variety of working conditions, such as unsmooth coupling between the inner wall of the track beam and the track.

Thus, the transmission route of the vertical excitation on the tested train can be set as follows: the vertical hydraulic vibrator 2 operates under the control of the computer control system, generates excitation and displacement, and transmits the excitation to the permanent magnet track rotating and supporting platform 3 on the hydraulic excitation system, and the permanent magnet track rotating and supporting platform 3 then transmits the vertical excitation to the rotating disc, then the vertical excitation is transmitted to the permanent magnet track arranged at the periphery, and finally to the permanent maglev module 16 and the levitation frame 6 of the permanent maglev train through the change of the magnetic field of the permanent magnet track; finally, the excitation is transmitted to the tested train connected to the permanent maglev frame 6.

The transmission route of the vertical excitation on the tested train can be set as follows: The lateral hydraulic vibrator 12 for guide module acts under the control of the computer control system, generates excitation and displacement, and transmits the excitation to the U-shaped frame on the hydraulic excitation system, then the excitation is transmitted to the roll shafts, and then to the guide module 17 through the rollers; next, the excitation is transmitted from the guide module 17 to the levitation frame 6 of the permanent maglev train, and finally to the tested train connected to the levitation frame of the maglev train. In addition, the lateral hydraulic vibrator 11 arranged on the base further generates excitation and displacement in response to the control of the computer control system, and the excitation is transmitted to the permanent magnet track rotating and supporting platform 3 on the hydraulic excitation system, and then to the permanent magnet track rotating disc 10; next, the excitation is transmitted to the permanent magnet track 4, and finally to the permanent maglev module 16 by means of the magnetic force transmitted to the permanent magnet track 4; the lateral excitation of the lateral hydraulic vibrator 11 is transmitted to the levitation frame 6 of the permanent maglev train through the change of the magnetic force on the permanent maglev module 16, and finally to the tested train connected to the levitation frame 6 of the permanent maglev train.

Thus, the route in the simulation vibration test on the train-track coupling of the permanent maglev train can be designed as follows: The permanent maglev train to be tested is levitated over a Halbach permanent magnet track mounted on the rotating disc via the permanent maglev module 16 on the levitation frame 6 of the permanent maglev train, and the guide module 17 on the levitation frame 6 of the permanent maglev train is in contact with the rollers 14; when the longitudinal restraining platform 15 for levitation mechanically restrains the levitation frame 6 of the permanent maglev train in the longitudinal direction by means of the pull rods, the actions of the vertical hydraulic vibrator 2, the lateral hydraulic vibrator 11 and the lateral hydraulic vibrator 12 for guide module can be controlled by the computer to generate excitation and transmit the excitation to the tested train through the test platform; then a plurality of response parameters, such as the levitation capability of the levitation system, the vibration characteristic of the entire train and the like, are tested by using testing devices such as the force sensor and the vibration sensor arranged on the train; the rotation speed of the permanent magnet track is obtained from the rotation speed of the permanent magnet track rotating motor 9 controlled by the computer, so as to simulate the running speed of the permanent maglev train; and various response parameters of the simulated track beam are tested by using testing devices such as the force sensor and the vibration sensor provided with the suspension platform 7.

While some embodiments of the present application are described above in detail, those embodiments should not be understood as constituting any limitation to the scope of the present application. Those having ordinary skills in the art should understand that various modifications and improvements can be made without departing from the concept of the present application, but all such modifications and improvements shall be deemed as falling in the scope of protection of the present application.

What is claimed is:
1. A vibration test bench for a permanent maglev train, comprising:
    a base (1);
    a vertical excitation system arranged on the base (1) for outputting vertical excitation;
    a permanent magnet track simulation system, the bottom of which is connected to the vertical excitation system and receives the vertical excitation outputted from the vertical excitation system to move up and down;

a gantry-type supporting frame (5) spanning the permanent magnet track simulation system and having a cross beam fixed above the permanent magnet track simulation system;
    a suspension platform (7) fixedly connected to the cross beam of the gantry-type supporting frame (5) and arranged between the cross beam and the permanent magnet track simulation system for accommodating a levitation frame (6) of the permanent maglev train to run therein in a levitated state;
    a lateral excitation system for outputting lateral excitation; and
    a longitudinal excitation system arranged at the top of the suspension platform (7), wherein the suspension platform (7) and the levitation frame (6) of the permanent maglev train are connected for restraining the degree of freedom of the longitudinal displacement of the levitation frame (6) of the permanent maglev train.

2. The vibration test bench for a permanent maglev train of claim 1, wherein the vertical excitation system comprises:
    a vertical hydraulic vibrator (2), the bottom of which is fixedly connected to the base (1); and
    a permanent magnet track rotating and supporting platform (3), which is arranged above the base (1) and fixedly connected to the top of the vertical hydraulic vibrator (2), and is driven by the vertical hydraulic vibrator (2) to move up and down with respect to the base (1).

3. The vibration test bench for a permanent maglev train of claim 2, wherein the permanent magnet track simulation system comprises:
    rolling bearings fixedly mounted above the permanent magnet track rotating and supporting platform (3);
    a fixed rotating shaft mounted in the rolling bearings and arranged between the cross beam of the gantry-type supporting frame (5) and the permanent magnet track rotating and supporting platform (3) in parallel;
    a permanent magnet track rotating disc (10), which is rotatably mounted on the fixed rotating shaft and arranged between the permanent magnet track rotating and supporting platform (3) and the suspension platform (7);
    a permanent magnet track rotating motor (9), which is a transmission connection to the fixed rotating shaft and drives the permanent magnet track rotating disc (10) to rotate;
    a permanent magnet track (4), which is laid on the periphery of the permanent magnet track rotating disc (10) and arranged below the levitation frame (6) of the permanent maglev train in the suspension platform (7), and synchronously rotates along with the rotation of the permanent magnet track rotating disc (10); wherein
    the levitation frame (6) of the permanent maglev train is levitated above the permanent magnet track (4) and maintained in the suspension platform (7).

4. The vibration test bench for a permanent maglev train of claim 1, wherein the lateral excitation system comprises:
    a lateral hydraulic vibrator (11), which is hinged between the base (1) and the permanent magnet track rotating and supporting platform (3), and configured to drive the permanent magnet track rotating and supporting platform (3) to drive the permanent magnet track rotating disc (10) and the permanent magnet track (4) to output lateral vibration force and displacement with respect to the levitation frame (6) of the permanent magnet train.

5. The vibration test bench for a permanent maglev train of claim 4, wherein the bottom of the suspension platform (7) is provided with an opening in which several rollers (14) are arranged; the rollers (14) are parallel to the cross beam and are arranged on two sides in the opening of the suspension platform (7), and the rollers (14) on the two sides are arranged opposite to each other and respectively fixed on two sides of the levitation frame (6) of the permanent maglev train for restraining the lateral displacement of the levitation frame (6) of the permanent magnet train.

6. The vibration test bench for a permanent maglev train of claim 5, wherein the lateral excitation system further comprises:

a lateral hydraulic vibrator (12) for guide module, which is fixedly arranged on an inner side wall of the suspension platform (7) and connected with the rollers (14) for outputting lateral excitation to drive the rollers (14) and adjusting the lateral spacing between the rollers (14) and the levitation frame (6) of the permanent maglev train.

7. The vibration test bench for a permanent maglev train of claim 5, wherein the top of the suspension platform (7) is further provided with a roller rotating motor (8), which is in a transmission connection with an upper roller shaft and a lower roller shaft arranged inside the suspension platform (7), wherein the upper roller shaft is in a transmission connection with ones of the rollers (14) mounted on the upper part of the inner side wall of the suspension platform (7), the lower roller shaft is in a transmission connection with other ones of the roller (14) mounted on the lower part of the inner side wall of the suspension platform (7), the upper roller shaft and the lower roller shaft are in a transmission connection via a coupling (13), and the roller rotating motor (8) drives the rollers (14) on the inner side wall of the suspension platform (7) to rotate correspondingly via the upper roller shaft and the lower roller shaft.

8. The vibration test bench for a permanent maglev train of claim 1, wherein the longitudinal excitation system comprises:

a longitudinal restraining platform (15) for levitation, which is fixedly arranged at the inner side of the suspension platform (7) and located at the top of the levitation frame (6) of the permanent maglev train.

* * * * *